United States Patent [19]

Busby

[11] Patent Number: 4,776,011
[45] Date of Patent: Oct. 4, 1988

[54] RECURSIVE KEY SCHEDULE CRYPTOGRAPHIC SYSTEM

[75] Inventor: Bruce E. Busby, Mountain View, Calif.

[73] Assignee: Sony Corporation, Tokyo, Japan

[21] Appl. No.: 545,079

[22] Filed: Oct. 24, 1983

[51] Int. Cl.$^4$ .............................................. H04L 9/00
[52] U.S. Cl. ........................................ 380/37; 380/28
[58] Field of Search ............... 178/22.07, 22.09, 22.15, 178/22.16, 22.05, 22.08; 380/23–25, 28, 29, 37

[56] References Cited

U.S. PATENT DOCUMENTS

| | | | |
|---|---|---|---|
| 3,796,830 | 3/1974 | Smith | 178/22.09 |
| 3,798,359 | 3/1974 | Ferstel | 178/22.09 |
| 4,004,089 | 1/1977 | Richard et al. | 178/22.15 |
| 4,160,120 | 7/1979 | Barnes et al. | 178/22.07 |
| 4,193,131 | 3/1980 | Lennon et al. | 178/22.07 |
| 4,206,315 | 6/1980 | Matyas et al. | 178/22.08 |
| 4,322,576 | 3/1982 | Miller | 178/22.07 |
| 4,408,093 | 10/1983 | Place | 178/22.09 |
| 4,520,232 | 5/1985 | Wilson | 178/22.05 |
| 4,578,530 | 3/1986 | Zeidler | 178/22.08 |
| 4,578,531 | 3/1986 | Everhart et al. | 178/22.08 |
| 4,605,820 | 8/1986 | Campbell, Jr. | 178/22.08 |

Primary Examiner—Salvatore Cangialosi
Assistant Examiner—Aaron J. Lewis
Attorney, Agent, or Firm—Philip M. Shaw, Jr.

[57] ABSTRACT

An encryption system in which a code word is processed, byte by byte, by a Vernan type process followed by non-linear encryption techniques, all of which are repeated several times, to generate a working key schedule. This key schedule is then used in the same process to encrypt the text.

14 Claims, 4 Drawing Sheets

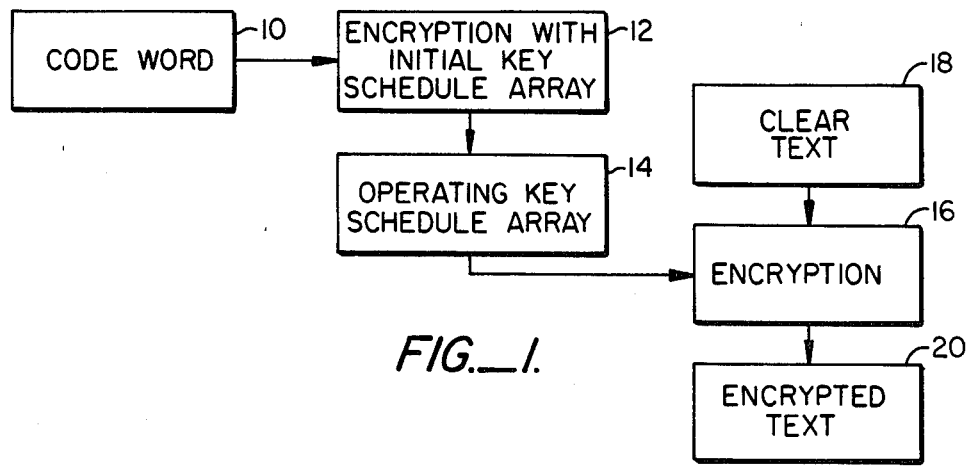
FIG._1.
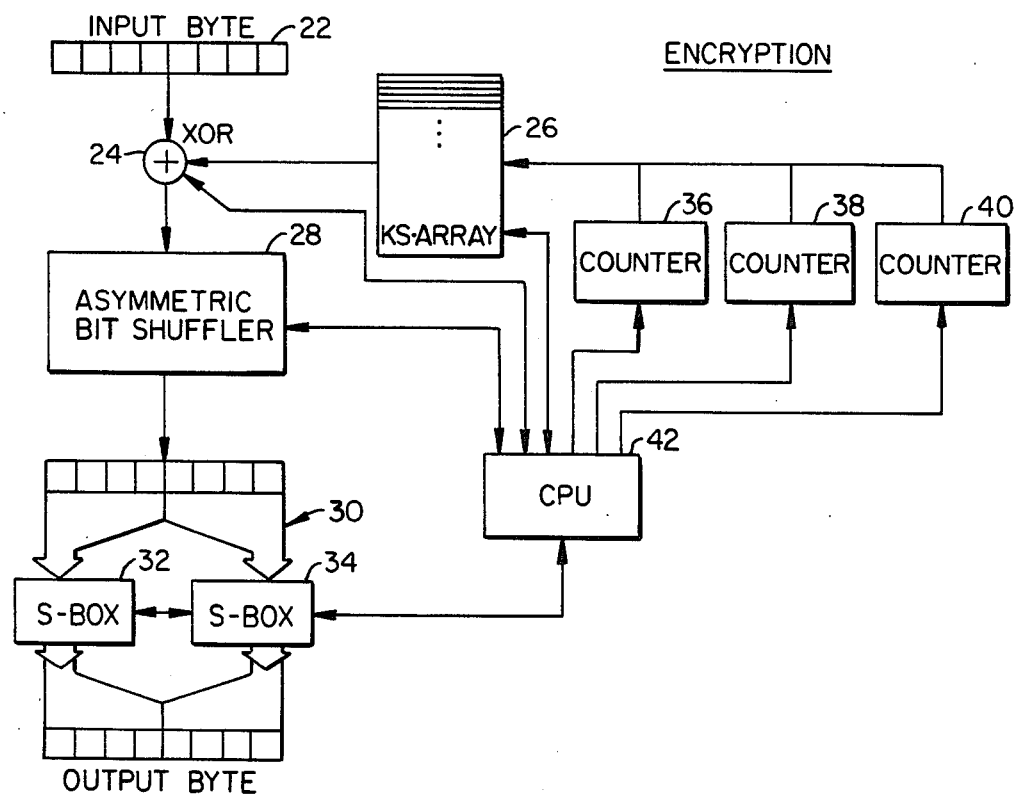
FIG._2.

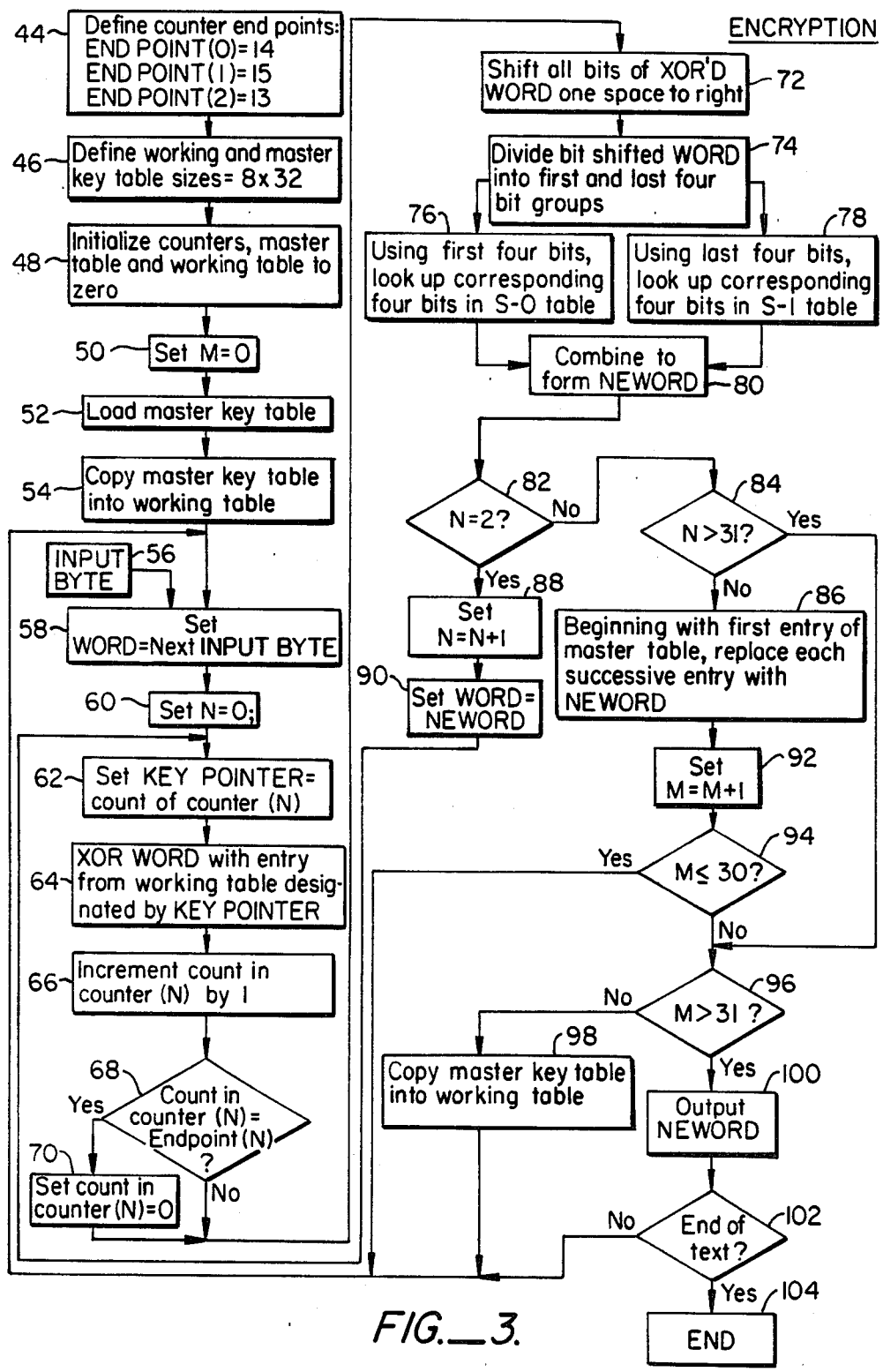
FIG._3.

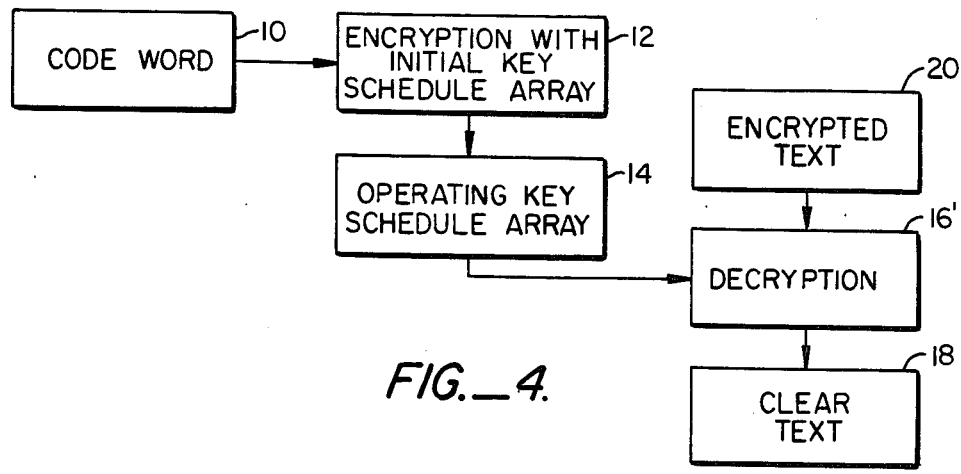
FIG._4.
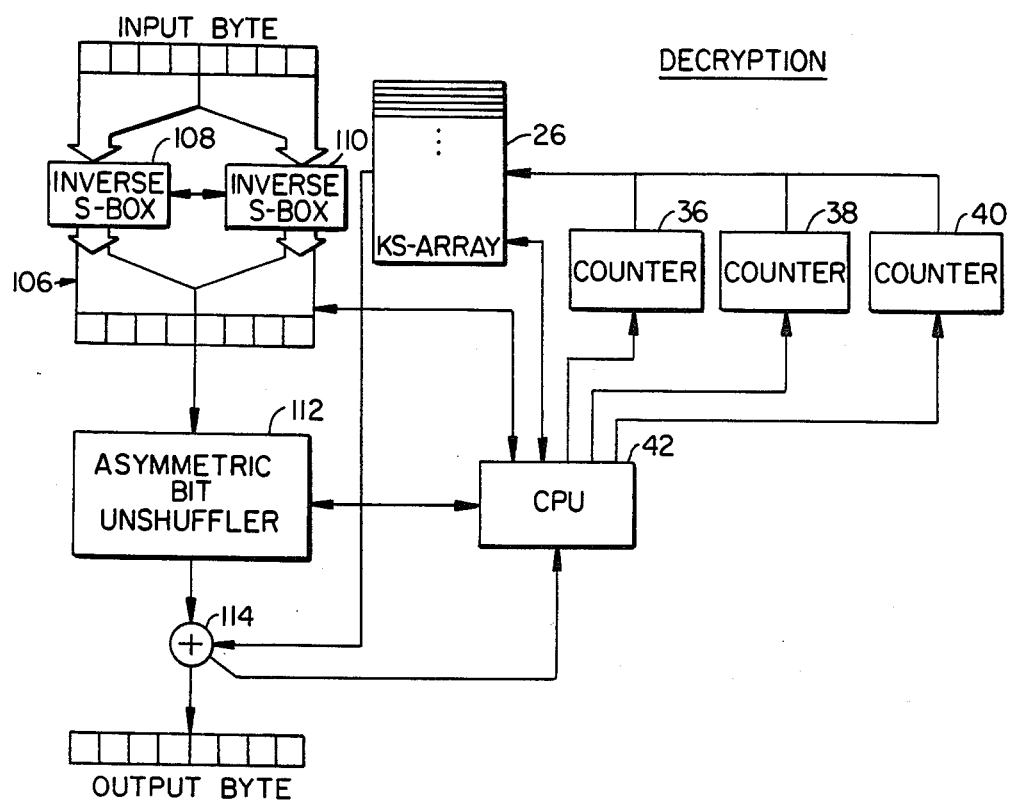
FIG._5.

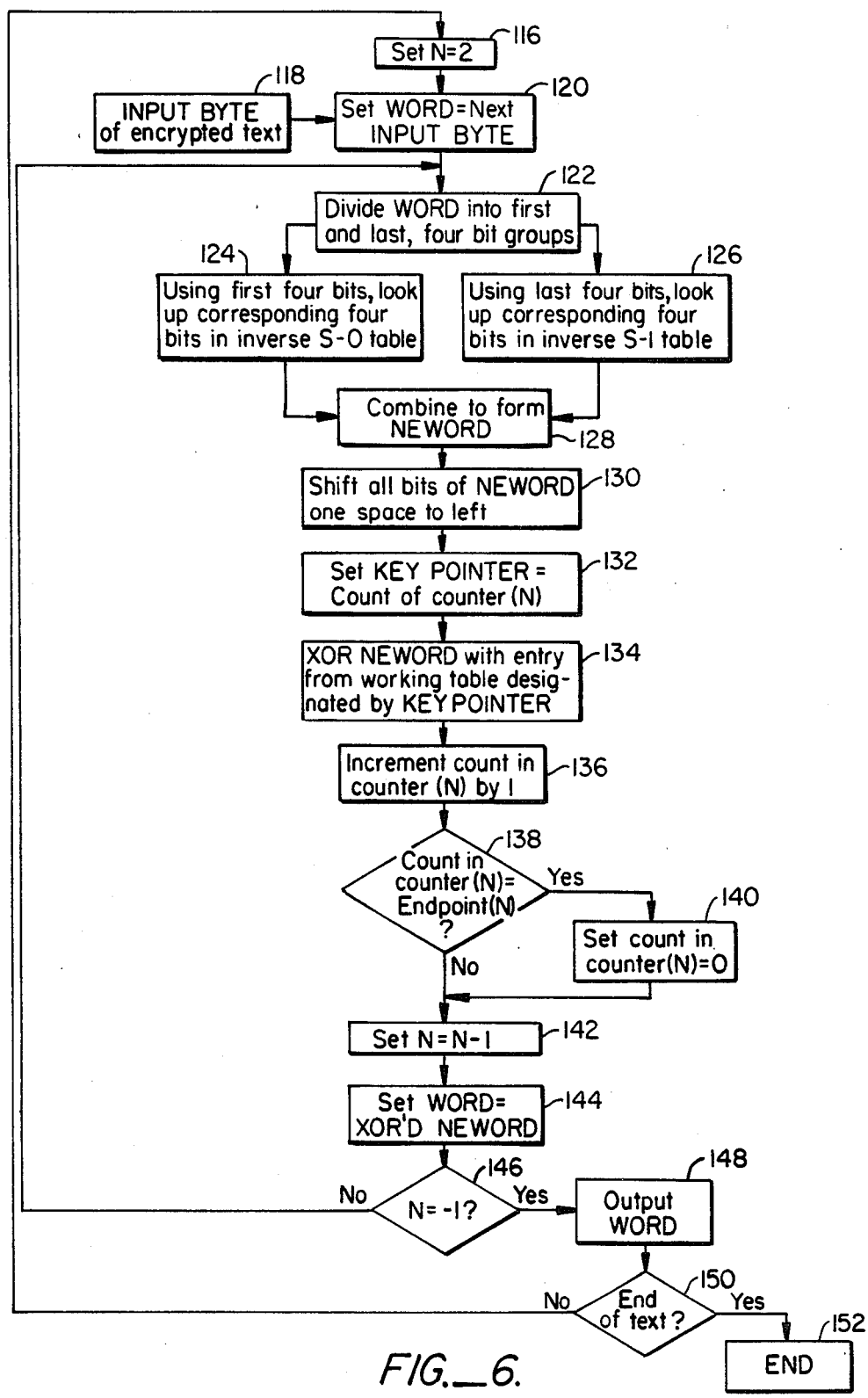
FIG._6.

RECURSIVE KEY SCHEDULE CRYPTOGRAPHIC SYSTEM

TECHNICAL FIELD

This invention relates to an encryption apparatus and method and, more particularly, to a method for encrypting digital words.

BACKGROUND OF THE INVENTION

It is often desirable to provide some system or apparatus for encrypting computer software particularly where it is desired to prevent tampering with the software by a person who is in possession of the software. An example is a student who is using educational computer programs in which his score is retained in the computer memory disk which the student may have in his possession. The difficulty with prior art attempts at providing such a system was that they required relatively large code and data requirements, such as in the IBM/NBS DES type systems.

It is also desirable that the nature of the encryption should provide a form of electronic signature for each originating user. This will allow the person deciphering the text to determine whether the presenter of the encrypted text is authorized to be in possession of it. The encryption system must allow for a transfer of data among users of the authoriing systems.

SUMMARY OF THE INVENTION

The above and other objectives are achieved with the present invention of an apparatus for encrypting text which is in digital form, which apparatus comprises means for encrypting text after first generating a working, encryption key schedule from a code word furnished by the user, an initial key schedule, and a non-linear encryption means. This allows only the encrypted text to be stored without the requirement of also storing or transmitting the working, encrypting key schedule. It also greatly reduces the size of the encrypting software program and increases its speed of execution.

The system includes a master table and a working table in the form of random access, addressable memories, a plurality of resettable counters of different counting capacities, an exclusive OR logic means which has two inputs and an output, first asymmetric bit shuffling means which is supplied with the output of the exclusive OR logic means for shifting each bit position of an incoming digital word to a different bit position and outputting the result, and first look-up table means for storing predetermined, addressable words, and for dividing an incoming digital word supplied from the output of the asymmetric bit shuffling means into predetermined bit groups which are used to address the stored words and to cause them to be output. The apparatus further includes control means which is connected to the master table and working table memories, the exclusive OR logic means, the counters, and the look-up table means for causing these devices to carry out the following sequence of steps.

First, the working table memory is loaded with initial, predetermined key schedule data and, thereafter, the exclusive OR logic means is caused to exclusive OR a code word in predetermined groups of bits with an entry in the master table memory which is selected by reference to the count in one of the counters. Next, the count in that counter is incremented. The output of the exclusive OR logic means, is input to the first asymmetric bit shuffling means so that each bit position of the incoming exclusive ORed word is shifted to a different bit position and the output is supplied to the first look-up table means. There, it is divided into two predetermined bit groups which are used as addresses in the look-up table to cause the stored words at those addresses to be output.

The words output from the look-up table means are then supplied back to the input at the exclusive OR logic means and the whole sequence is repeated a plurality of times using a different one of the counters each time during the exclusive OR process. Finally, the output of the look-up table means is stored as a sequential entry in the master table memory. This process is repeated until the entire code word has been processed in this fashion.

The above control sequence steps will cause the generation of a new, working key schedule based on the input code word. In order to thereafter encrypt any further digital text, the control means carries out the following sequence of steps. It first transfers the contents of the master table memory to the working table memory. It then causes the exclusive OR logic means to exclusive OR input text words, in predetermined groups of bits, with an entry in the working table memory which is selected by reference to the count in one of the counters. Next, the control means increments the count in that counter. Again, the exclusive OR word is bit shuffled and fed through the look-up table means and the output of the look-up table means is then resupplied as the input word to the exclusive OR logic means, much as in the sequence above.

The sequence is repeated a plurality of times using a different one of the counters each time, in a defined sequence, and finally the result from the first look-up table means is output as an encrypted text word. Thus, the text has now been encrypted using the working key schedule generated from the code word, i.e. by recursive key schedule generation. Deciphering can only be accomplished by one who has the code word, the original key table, and who has access to the asymmetric bit shuffler and look-up table means.

Decryption initially proceeds much along the same lines, however, after the working key schedule has been generated using the original code word, the process is substantially reversed. The incoming encrypted text is caused by the control means to be supplied to a second look-up table which accomplishes the reverse of the first look-up table means with respect to what is input to it. The output of this inverse look-up table means is supplied to a second asymmetric bit shuffler which effectively "unshuffles" the bits in the opposite direction to, and by the same amount as the first asymmetric bit shuffling means to restore them to their original positions. The output of this second asymmetric bit shuffling means is then exclusive ORed by a second exclusive OR logic means with an entry in the working table memory which is selected by the count in one of the counters. The counter is thereafter incremented by the control means and the output at the second exclusive OR logic means is supplied back to the input of the second look-up table means and the process is repeated a plurality of times using a different one of the counters each time. The sequence in which the counters are used is the opposite from that used in encrypting the text. Finally, the output of the second exclusive OR logic means will result in a clear text word.

In order to further provide for randomness during the encryption process, each counter is allowed to count to a different, predetermined number, which numbers have no common factors. Thereafter, each counter is reset by the control means.

Both the initial master key schedule and code word are known to the operator who is undertaking the decryption process, however, only the code word is known to the person undertaking the encryption process. Thus, it will be apparent to the decoder whether or not the presenter of the encoded message is authorized to receive the decrypted message or to otherwise use it since the key schedule and code word are unique to the particular authorized user.

It is therefore an object of the present invention to provide an encryption system having recursive key schedule generation.

It is another object of the present invention to provide an encryption system having small software requirements.

It is still another object of the invention to provide an encryption system which prevents tampering with the encrypted data files by the person in possession of them.

It is a further object of the invention to provide an encryption system in which a digital signature of the originator of the data can be checked to determine whether the possessor of the encrypted data is authorized to have it.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram illustrating the operation of the system of the invention during encryption.

FIG. 2 is a block diagram illustrating the encryption apparatus of the invention.

FIG. 3 is a flow chart illustrating the operation of the system depicted in FIG. 1.

FIG. 4 is a block diagram illustrating the operation of the system of the invention during decryption.

FIG. 5 is a block diagram illustrating the decryption apparatus of the invention.

FIG. 6 is a flow chart illustrating the operation of the system during the decryption process.

DETAILED DESCRIPTION OF THE INVENTION

Referring now more particularly to FIG. 1, an initial code word or key word 10 which is supplied by the user, is encrypted at step 12 using an initial key schedule array. This initial key schedule array might be furnished, for example, by the intended recipient of the encrypted text. During the encryption step 12, the code word is used to generate an operating or "working" key schedule array 14. Clear text 18 is then encrypted at step 16 using the operating key schedule array 14 to produce encrypted text 20.

Referring now more particularly to FIG. 2, the specific encryption apparatus of the invention is illustrated. This basic encryption apparatus is used in both steps 12 and 16. An input byte 22, such as a byte of the code word 10, is exclusive ORed by exclusive OR logic means 24 with an entry selected from a key schedule array 26. The key schedule can be an initial, predetermined key schedule or it can be a key schedule which is generated using the code word, as will be described further herein. In selecting each eight bit grouping from the key schedule array 26 which is to be exclusive ORed with each input byte, a pointer is used which corresponds to the count in one of three counters 36, 38 or 40.

The exclusive ORed output is supplied to an asymmetric bit shuffler 28 which moves all the bits of the incoming word one or more places in a given direction, for example one bit to the right.

The bit shuffled output is next supplied to the input of a look-up table means 30. The look-up table means 30 divides the incoming word into the first and last four bit groups. The first four bit groups are supplied at the input to an s-box 32 which is, in essence, a first look-up table. The incoming word is used as the address to locate a predetermined stored word in the s-box 32 which is then output as the first four bits of the output word. Similarly, the last four bits of the incoming word are fed to an s-box 34 which performs the same function and generates the corresponding last four bits of the output word. The bit shuffler 28 and the look-up table 30 provide a non-linear encryption, i.e. a "diffusion" scheme.

The exclusive OR means 24, the key schedule array memory 26, the asymmetric bit shuffler 28, the look-up table means 30, and the counters 36, 38 and 40 are all under the control of a CPU 42 which is connected to them. The particular way in which the CPU 42 operates these devices will now be explained in reference to FIG. 3 which is a flow chart illustrating both a program of steps carried out in the CPU 42 and the sequence of events which is produced by the operation of these devices by the CPU 42 following these programmed steps.

Referring now more particularly to FIG. 3, the CPU 42 initially defines the endpoints of the counters 36, 38 and 40. This is the point at which the respective counters will automatically be reset to an initial value, such as zero. In the illustration, the endpoint for counter 30 is defined as ENDPOINT (0) and is set equal to 14. The end-point for counter 38 is defined as ENDPOINT (1) and is set equal to 15. The endpoint for counter 40 is defined as ENDPOINT (2) and is set equal to 13. Thus, for example, when the counter 38 reaches a count of 15, it will automatically be reset to 0.

Next, in step 46, the CPU 42 must define the working and master key table memory sizes, which in this example are eight bits by 32 bits. The counters 36, 38 and 40 are thereafter initialized to 0 in step 48. Also, the master and working table memories, which are illustrated symbolically as the array 26 in FIG. 2, are also initialized to 0 by the CPU 42. At step 50, a variable integer, defined as M, is set equal to 0. M represents the number of the byte in the sequence of the input bytes, which is currently undergoing encryption. M equals zero refers to the first byte. The CPU will then load predetermined initial key schedule data into the master key table memory at step 52. The master key table contents are then copied into the working table memory at step 54.

At steps 56 and 58, incoming words, one byte at a time, are fed into the CPU 42 and are assigned a variable designation. Thus, at step 58, the variable WORD is set equal to the next INPUT BYTE supplied at step 56.

At step 60, a variable N, which represents which of the three counters 36, 38 or 40 is in use, is set equal to 0 corresponding to counter 36. A variable designated as KEY POINTER is then set equal to the count of counter (N) at step 62. When N is a value 0, the count in counter 36 will be assigned to the KEY POINTER. When N is equal to 1, the count of counter 38 will be assigned to the KEY POINTER and when N is equal to 2, the count of counter 40 will be assigned to the KEY POINTER.

At step 64, the CPU 42 causes the variable WORD to be exclusive ORed by logic means 24 with an entry from the working table array 26 which is designated by the value of KEY POINTER. Thus, when N equals 0, the contents of the array 26 at the address designated by the count in counter 36, are exclusive ORed with the variable WORD which, as mentioned above, is equal to the input byte furnished at step 56.

At step 66, the count in counter (N) is incremented by 1. At the next step, 68, the CPU 42 inquires whether the count in counter (N) is equal to ENDPOINT (N). If the answer is yes, the count in counter (N) is set equal to 0 in step 70. If the answer is no, the CPU 42 proceeds to cause the asymmetric bit shuffler 28 to shift all the bits of the exclusive ORed WORD one space to the right at step 72. The resultant eight bit word from this operation is then divided into first and last four bit groups at step 74 by the look-up table means 30. Using the first four bits, the CPU 42 looks up in the look-up table 32 the corresponding four bits at step 78 and the CPU uses the last four bits to look up the corresponding four bits in the table 34. The output at step 76 is used as the first four bits and the output of step 78 is used as the last four bits to produce a new eight bit word which is defined as NEWORD at step 80.

At step 82, the computer checks N to see if it is equal to 2. This would indicate that all three counters 36, 38 and 40 have now been accessed. If the answer is no, the CPU 42 proceeds directly to step 88, at which it sets N equal to N+1 and, at step 90, sets WORD equal to NEWORD. The CPU then returns to step 62 and repeats steps 62 through 82 using, in turn, the contents of each of the counters 36, 38 and 40 to encrypt the input bytes supplied at 56. After the counter 40 has been used, N will be equal to two and the CPU 42 will proceed to step 84 where it determines whether M is greater than 31. This would indicate that all 32 bytes of the code word had been encrypted. Assuming that M is not greater than 31, the CPU 42 will proceed to step 86 and, beginning with the first entry of the master table memory, the CPU 42 will replace each successive entry with NEWORD at step 86.

Thereafter, the CPU 42 will increment M by 1 at step 92 and will ask the question, at step 94 whether M is less than or equal to 30. Until all of the bytes of the code word have been encrypted, the answer will be no and the CPU will return to step 58 and input the next byte of the code word at step 56. The CPU will repeat steps 56 through 94 until M is greater than 30, i.e. M is equal to 31. The CPU 42 will then proceed to step 96 where the determination is made as to whether M is greater than 31. At the point where M is equal to 31, that is, the last eight bits of the code word have been encrypted, the CPU 42 will then copy the contents of the master key table memory into the working table memory at step 98. The CPU 42 will then proceed to step 58 and will continue to receive INPUT BYTES, which will now be the text 18. The CPU 42 will proceed in the same fashion to encrypt each successive eight bits of the input text using the steps 58–84, inclusive, but will bypass the steps 86, 92, 94 and 98 and will simply output each eight bits of NEWORD at step 100 until the end of text is determined at step 102 at which time the program will end at 104. It will be appreciated that the size of the encryption program is much smaller than prior art approaches and much faster to execute.

Referring now more particularly to FIG. 4, during decryption, the same steps 10, 12 and 14, as described in reference to FIG. 1, are repeated but the encrypted text 20 is then decrypted by process 16' into the original clear text 18. Thus, the operating key schedule array 14 is regenerated simply using the code word 10 and the initial key schedule array which was retained by the recipient of the encrypted text.

Referring now more particularly to FIG. 5, the apparatus used in the decryption step 16' will be described. Each successive input byte of encrypted text is divided into the first and last four bit groupings and these are separately supplied as inputs to inverse look-up table means 106, made up of tables 108 and 110, which perform exactly the opposite functions from the look-up table 30. That is, the contents of the look-up tables 108 and 110 are simply the inverse of the contents of the look-up tables 32 and 34, respectively. The outputs from the look-up tables 108 and 110 are supplied as the first four and last four bit groupings of a new word which is then supplied as the input to an asymmetric bit unshuffler 112. The unshuffler means 112 shifts all the bits in the opposite direction and by the same amount as was done by the bit shuffler 28.

The output from the unshuffler means 112 is then exclusive ORed in the exclusive OR logic means 114 with an entry from the key schedule array 26 selected by the count in the counter 40. The count in counter 40 is then incremented. The result is then fed back to the input and the process is repeated, successively, for counters 38 and 36, in that order, to produce eight bits of clear text. Again, all of the means 106, 112 and 114 as well as the memory 26 and the counters 36 through 40 are operated under the control of the CPU 42. It must be remembered, however, that the apparatus depicted in FIG. 5 is only used for decrypting the clear text and is not used for generating the operating key schedule from the code word. This is done in the same manner as explained above in reference to FIGS. 2 and 3.

Thus, with reference to FIG. 6, during decryption, the CPU 42 generates the operating key schedule by repeating the steps 44 through 98, skipping only step 84 to proceed directly from step 82 to step 86. After the CPU 42 has determined that all of the bytes of the code word have been encrypted to form the operating key schedule which is stored in the master key table, and the master key table has been copied into the working table at step 98, the CPU 42 will then proceed to decrypt the text.

The process begins at step 116 by setting N equal to 2. The CPU 42 next takes the first INPUT BYTE of the encrypted text furnished at step 118 and sets WORD equal to next INPUT BYTE at step 120. At step 122, the CPU divides WORD into the first and last four bit groups and using the first four bits looks up the corresponding four bits in the inverse look-up table 108 and uses the last four bits to look up the corresponding four bits in the inverse table 110. The output from step 124 becomes the first four bits of a NEWORD and the output of step 126 becomes the last four bits of NEWORD at step 128. At step 130, the CPU 42 causes the unshuffler means 112 to cause all of the bits of NEWORD to be shifted one space to the left, that is, the opposite of what was done at steps 74, 76 and 78.

The CPU 42 next sets the KEY POINTER equal to the count of counter (N) at step 132. NEWORD is then exclusive ORed with the entry from the working table memory which is designated by the KEY POINTER at step 134. The count in counter (N) is then incremented by one at step 136.

The CPU 42 then makes the determination whether the count in counter (N) is equal to the ENDPOINT (N) at step 138. If the particular counter has reached its endpoint, the count in the counter is reset to 0 at step 140. The CPU 42 then decrements N by 1 at step 142 and thereafter sets WORD equal to the exclusive ORed NEWORD at step 144. The first eight bits of encrypted text have now made one pass through the apparatus depicted in FIG. 5. As was done during the encryption process, this sequence of steps is repeated twice more, that is the steps are repeated in total for each of the counters 40, 38 and 36, in that order. The completion of this stage is determined at step 146 by asking whether N is equal to $-1$. If the answer is no, that is, not all of the counters have been used, the CPU 42 returns to step 122 and repeats the steps 122 through 146 until N does equal $-1$. Thereafter, at step 148, WORD is output as clear text 18. If the end of the text has not been reached at step 150, the CPU returns to step 116 and processes the next INPUT BYTE of encrypted text. This process is repeated for steps 116 through 150 until the end of text is determined at which point the CPU ends the program at step 152.

Thus, the encryption system of the present invention is shown to provide for a recursive key schedule generation using a single code word which greatly reduces the data storage requirements of the system. While in the above-described embodiments particular non-linear encrypting means (items 28, 30, 106 and 112) are illustrated and are certainly preferred, it is at least possible that many of the teachings of the present invention can be utilized with other types of non-linear encryption means.

While in the above-described embodiments the counts in the counters are not reset after the working key schedule is generated, in other embodiments this additional step can be taken to eliminate a possible source of error.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:

1. An encryption system for encryypting text in the form of a succession of digital words using a code word, the apparatus comprising
    means for generating an array of different encrypted working keys from the code word at a first predetermined time; and
    means for subsequently encrypting the text with the array of encrypted working keys, using each encrypted key in a predetermined sequence to encrypt a different digital word.

2. Apparatus using recursive key schedule generation for encrypting text which is in digital form, the apparatus comprising
    a master table random access, addressable memory;
    a working table random access, addressable memory;
    a plurality of resettable counters of different counting capacities;
    exclusive OR logic means having at least two inputs and an output;
    non-linear means for receiving the output of the exclusive OR logic means, encrypting it, and producing the results as an output;
    control means connected to the master table and working table memories, the exclusive OR logic means, the counters, and the non-linear encryption means for loading the working table memory with a master key array, for thereafter causing the exclusive OR logic means to exclusive OR a code word, in predetermined groups of bits, with a succession of different keys from the working table memory selected by reference to the count in one of said counters, for incrementing the count in said one counter, for supplying the output of the non-linear encryption means as the input to the exclusive OR logic means, for repeating this sequence a plurality of times using a different one of the counters each time and storing the output of the non-linear encryption means as a sequential entry in the master table memory, repeating these operations until the entire code word has been encrypted, loading the contents of the master table memory into the working table memory to thereby provide an array of encrypted, working keys, and thereafter repeating this operation for sequential groups of digital bits of text and outputting the result.

3. Encryption apparatus as recited in claim 2 wherein the non-linear encryption means comprises
    first asymmetric bit shuffling means supplied with the output of the exclusive OR logic means for shuffling each bit position of an incoming digital word to a different bit position, and outputting the result, and
    first look-up table means for storing predetermined, addressable words, and for dividing an incoming digital word supplied from the output of the first asymmetric bit shuffling means into predetermined bit groups which are used to address the stored words and to cause them to be outputted.

4. Apparatus for encrypting text which is in digital form, the apparatus comprising
    a master table random accesss, addressable memory;
    a working table random access, addressable meory;
    a plurality of resettable counters of different counting capacities;
    exclusive OR logic means having at least two inputs an an output;
    first asymmetric bit shuffling means supplied with the output of the exclusive OR logic means for shuffling each bit position of an incoming digital word to a different bit position, and outputting the result;
    first look-up table means for storing predetermined, addressable words, and for dividing an incoming digital word supplied from the output of the first asymmetric bit shuffling means into predetermined bit groups which are used to address the stored words and to cause them to be outputted; and
    control means connected to the master table and working table memories, the exclusive OR logic means, the counters, the asymmetric bit shuffling means, and the look-up table means for loading the working table memory with a predetermined master key array, for thereafter causing the exclusive OR logic means to exclusive OR a code word, in predetermined groups of bits, with a succession of different keys from the working table memory selected by reference to the count in one of said counters, for incrementing the count in said one counter, for supplying the output of the look-up table means, as the input to the exclusive OR logic means, for repeating this sequence a plurality of times using a different one of the counters each time and for finally storing the output of the look-up table means as a sequential entry in the master table memory to thereby generate an array of encrypted working keys.

5. Text encryption apparatus as recited in claim 4 wherein the control means transfers the contents of the master table memory to the working table memory and further causes the exclusive OR logic means to exclusive OR input text words, in predetermined groups of bits, with a succession of different keys from the working table memory selected by reference to the count in one of said counters, wherein the control means increments the count in said one counter and supplies the output of the first look-up table means as the input word to the exclusive OR logic means, and repeats this sequence a plurality of times using a different one of said counters each time, and finally outputs the result from the first look-up table means.

6. Text encrytion apparatus as recited in claim 3,4 or 5 further comprising text decryption apparatus including second look-up table means which accomplishes the reverse of the first look-up table means with respect to words input to it, second asymmetric bit shuffling means, supplied with the output of the second look-up table means, for shifting each bit position of an incoming digital word in the opposite direction to, and by the same amount as, the first asymmetric bit shuffling means and outputting the result to the input of the exclusive OR logic means, and further wherein the control means causes encrypted digital words to be input to the second look-up table means in prdetermined groups of bits, causes the exclusive OR logic means to exclusive OR the resulting output from the second asymmetric bit shuffling means with a succession of different keys from the working table memory selected by reference to the count in one said counters, increments the count in said one counter, supplies the output of the exclusive OR logic means to the input of the second look-up table means, repeats this sequence a plurality of times using a different one of said counters each time, and finally outputs the result from the exclusive OR logic means.

7. Text encryption apparatus as recited in claims 2 or 4 further wherein the control means resets each of said counters after the count in each counter reaches a predetermined number, which number is different for each counter and with none of the numbers having any common factors.

8. A method of encrypting text in the form of a sucession of digital words comprising the steps of
(a) generating an array of different, encrypted working keys from a code word at a first predetermined time; and
(b) subsequently encrypting the text with the array of encrypted working keys, using each working key in a predetermined sequence to encrypt a different digital word.

9. A method of encrypting text comprising the steps of
(a) generating an array of different, encrypted working keys from a code word by:
 (a)(i) selecting a key from an array of different master keys by reference to the count is a first one of a series of counters;
 (a)(ii) exclusive ORing a predetermined number of bits of the code word with the selected key;
 (a)(iii) non-linearly encrypting the result;
 (a)(iv) advancing said counter by a predetermined amount;
 (a)(v) repeating, a predetermined number of times, steps (a)(i) through (a)(iv) while substituting the result in step (a)(iii) for the portion of the code word in step (a)(ii) and using the next counter in the sequence;
 (a)(vi) repeating steps (a)(i) through (a)(v) for sequential portions of the code word until the entire code word has been encrypted to form the array of encrypted working keys; and
(b) encrypting the text with the array of encrypted working keys, using each working key in a predetermined sequence.

10. An encryption method as recited in claim 9 wherein step (b) comprises the further steps of
(b)(i) substituting the working key array for the master key array and repeating steps (a)(i) through (a)(v) on portions of text instead of on portions of the code word; and
(b)(ii) repeating said step (b)(i) for sequential portions of the text.

11. An encryption method as recited in claim 10, comprising the additional decryption steps of
(c)(i) non-linearly decrypting the predetermined number of bits of encrypted text;
(c)(ii) exclusive ORing said non-linearly decrypted bits of text with a key selected from the working key array by reference to the count in the last counter of the sequence and thereafter incrementing the count in the counter by a predetermined amount;
(c)(iii) repeating steps (c)(i) and (c)(ii) while substituting the result in steps (c)(ii) for the bits of encrypted text in step (c)(i) and using the next counter in the reverse of the sequence used in step (a)(v); and
(c)(iv) repeating steps (c)(i) through (c)(iii) for sequential portions of the encrypted text.

12. An encryption method as recited in claims 9, 10 and 11 comprising the further steps of resetting each counter after it reaches a preset number, which number is different for each counter and has no common factors with the numbers for the other counters.

13. An encryption method as recited in claim 9, or 11 wherein the non-linear encrypting step (a)(iii) comprises the steps of
(d)(i) shuffling each bit position of the exclusive ORed result from step (a)(ii) to a different bit position;
(d)(ii) storing predetermined, addressable words, and
(d)(iii) dividing an incoming digital word supplied from the step (d)(i) into predetermined bit groups and addressing the stored words with these bit groups to cause them to be outputted.

14. An encryption method as recited in claim 13 wherein the non-linear decrypting step (c)(i) comprises the steps of
(e)(i) performing the step (d)(iii) in reverse with respect to an incoming digital word; and
(e)(ii) performing the step (d)(i) in reverse with respect to the result from step (e)(i).

* * * * *